Aug. 9, 1949.    J. P. WATSON    2,478,440
STEP-BY-STEP ELECTRICAL TRANSMISSION SYSTEM
Filed Feb. 26, 1947

Inventor
JOHN PERCIVAL WATSON
By Haseltine, Lake & Co.
Agents

Patented Aug. 9, 1949

2,478,440

UNITED STATES PATENT OFFICE 2,478,440

STEP-BY-STEP ELECTRICAL TRANSMISSION SYSTEM

John Percival Watson, Westminster, London, England, assignor to Vickers-Armstrongs Limited, London, England, a company of Great Britain Application February 26, 1947, Serial No. 731,108
In Great Britain April 6, 1939

Section 1, Public Law 690, August 8, 1946
Patent expires April 6, 1959

4 Claims. (Cl. 318—27)

This invention relates to step-by-step electrical transmission systems, that is to say systems of the kind in which the transmitter consists essentially of an electric commutator switch, either of the drum type or the "make and break" contact type, and the receiver motor of a field winding formed from a plurality of coils and a rotor adapted to set itself according to the excitation of the associated field winding, connections being made between the transmitter and receiver, such that a rotation of the transmitter causes the coils of the receiver field winding to be energised in sequence, whereby the receiver rotor turns in synchronism step-by-step with the transmitter.

In the employment of a step-by-step transmission system it is found, especially when the system is used as a torque amplifier, that sparking occurs at the transmitter which affects the performance of the receiver motor by reducing its effective torque and speed.

With a view to overcoming the difficulties of sparking it has previously been the practice to employ condensers connected between the output leads of the transmitter, the condensers being arranged in star or delta where there are three output connections from the transmitter.

It is a principal object of the present invention to provide a condenser system which will, as nearly as possible, achieve complete spark suppression whilst also improving the speed and smoothness of the transmission.

According to the invention, there is connected across the direct current supply leads of the transmitter, pairs of condensers (or equivalent group thereof) there being one pair in respect of each output lead from the transmitter and each such lead having a connection with its associated condenser pair joined between the condensers of the pair, so that there is at all times during the period when a contact is not actually broken in the transmitter, a discharged condenser (or condensers) ready to receive the charging current when the contact is broken.

Figure 1:
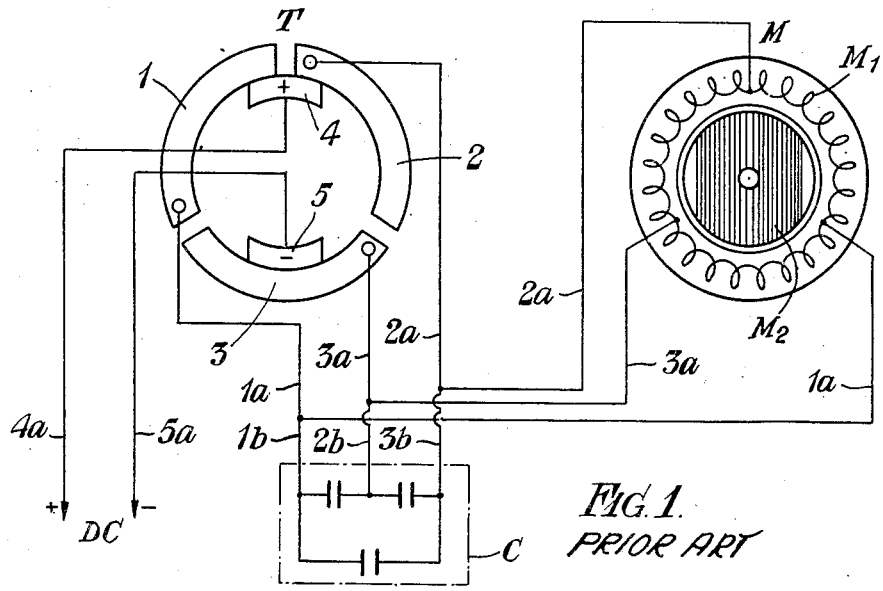
Figure 2:
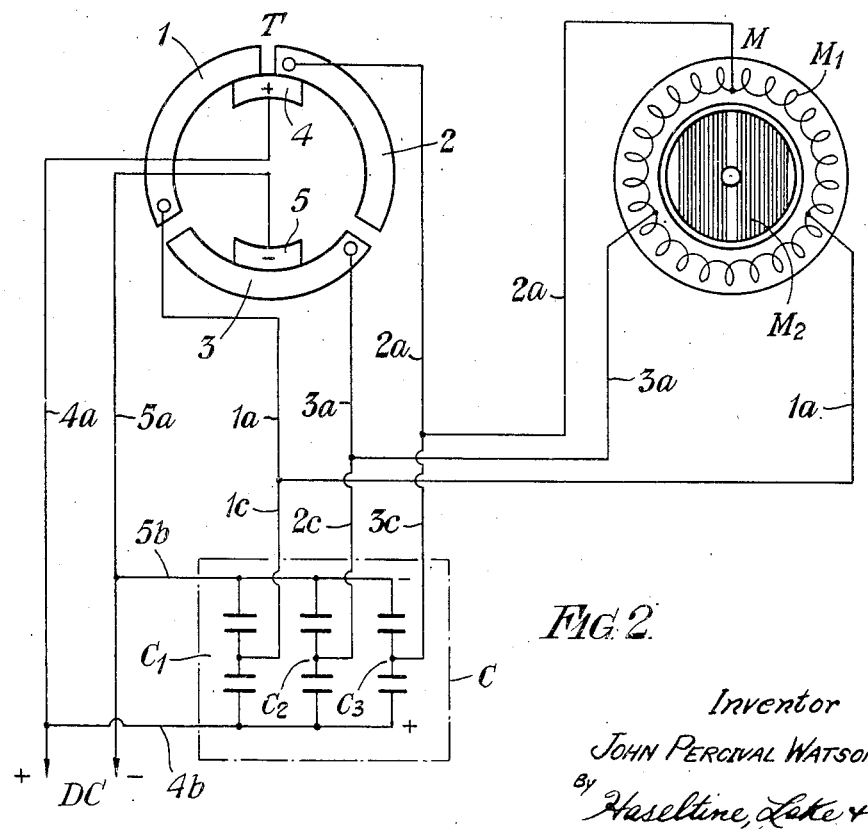

In order that the invention may be more clearly understood and readily carried into effect it will now be more fully described with reference to the accompanying drawings, in which:

Figure 1 illustrates diagrammatically an example of the kind of transmission system to which the invention relates and showing the known form of condenser connection, and Figure 2 is a view similar to Figure 1 but showing an example of the improved arrangement according to the present invention.

Like reference characters indicate like parts in both figures.

Referring more particularly to Figure 2, the transmitter, generally indicated at A, comprises three circularly disposed mutually insulated segments 1, 2 and 3, and two diametrically arranged brushes 4 and 5 which are adapted to rotate when the transmitter is operated. The brushes, when rotated, consecutively contact with each of the three segments 1, 2 and 3. The brush 4 is connected, by means of a lead 4a, to the positive side of a direct current supply marked D. C. in the figure, while the brush 5 is connected, by means of a lead 5a, to the negative side of the said supply. Since there are three segments to the transmitter T, there are three output phase lines 1a, 2a and 3a each of which is connected to its corresponding segment and which extend to the field winding of the motor receiver generally indicated at M. The motor receiver is designed to correspond to the transmitter described, by having a three-phase stator winding M1 co-operating with a laminated rotor M2.

In accordance with the known arrangement and as depicted in Figure 1, the three output phase lines 1a, 2a and 3a are connected by means of branch connections 1b, 2b and 3b to three condensers which are arranged in star or delta and are generally indicated at C. Although the provision of condensers arranged in this fashion conduces towards the result arrived at, namely the suppression of sparking at the transmitter, it has been found in practice that sparking is still apt to occur. Referring now to Figure 2 which indicates the improved arrangement according to the present invention, it will be seen that so far as the transmitter T, the receiver motor M, their connecting phase lines 1a, 2a and 3a, the brushes 4 and 5 and their direct current supply leads 4a and 5a are concerned, this arrangement is similar to that according to Figure 1. In the present instance, however, there are connected across the direct current supply leads 4a and 5a, i. e. connected in parallel with the brushes 4 and 5, two leads 4b and 5b between which are arranged the condensers generally indicated at C. These condensers are disposed in three parallel branches C1, C2 and C3 which are connected across the leads 4b and 5b, there being a pair of condensers in each branch. The centre point of each branch, that is to say, the point between the two condensers in each branch, is connected to one of the phase lines 1a, 2a and 3a by means of branch connections 1c, 2c and 3c.

From the described arrangement it will be understood that, whilst a brush is actually upon a segment, one of the two series-connected condensers is effectively shorted and remains, therefore discharged. As soon as the brush leaves the segment, however, the condenser hitherto shorted receives the charging current which would otherwise be dissipated by the arc formed between the brush and segment.

It will be understood that the described arrangement is modified where, for example, more than three output connections from the transmitter are employed. In this case, there would be a correspondingly increased number of branches including the pair of series-connected condensers.

As a further constructional modification, instead of using a pair of condensers a pair of groups of condensers might be employed according to practical requirements.

I claim:

1. In a step-by-step electrical transmission system having a transmitter, a receiver, connecting lines between said transmitter and receiver, and a direct current supply source for said transmitter, spark-suppressing means comprising for each one of said connecting lines a first capacitance, a second capacitance, series connections between said first and second capacitances, parallel connections between the direct current supply source and the series connected first and second capacitances, and a connection from the connecting line to a point between said first and second capacitances.

2. In a step-by-step transmission system having a transmitter, a receiver, electrical connecting lines between said transmitter and receiver, and a direct current source for supplying said transmitter, spark suppressing means for said transmitter comprising pairs of series connected capacitances in number corresponding to the number of connecting lines between said transmitter and receiver parallel connections extending across the pairs of series connected capacitances and joining to said direct current source, and connections one from each said connecting line to a point midway a capacitance pair.

3. In a step-by-step transmission system having a transmitter, a receiver, electrical connecting lines between said transmitter and receiver, and a direct current source for supplying said transmitter, spark suppressing means for said transmitter according to claim 2 in which the capacitance pairs are each constituted by a pair of condensers.

4. In a step-by-step transmission system having a transmitter, a receiver, electrical connecting lines between said transmitter and receiver, and a direct current source for supplying said transmitter, spark suppressing means for said transmitter, according to claim 2 in which said capacitance pairs are each constituted by a pair of groups of condensers.

JOHN PERCIVAL WATSON.

REFERENCES CITED

The following references are of record in the file of this patent:

UNITED STATES PATENTS

| Number | Name | Date |
| --- | --- | --- |
| 1,653,946 | Clausen | Dec. 27, 1927 |
| 1,922,759 | Davis | Aug. 15, 1933 |